United States Patent [19]

Fralish

[11] 4,418,519

[45] Dec. 6, 1983

[54] ENDLESS CHAIN TYPE LAWN MOWER

[75] Inventor: Mark R. Fralish, Berlin, Wis.

[73] Assignee: J. I. Case Company, Racine, Wis.

[21] Appl. No.: 403,248

[22] Filed: Jul. 29, 1982

[51] Int. Cl.³ .............................................. A01D 55/24
[52] U.S. Cl. ........................................ 56/244; 56/291
[58] Field of Search ................ 56/244, 290, 291, 295, 56/13.4, 245, 292

[56] References Cited

U.S. PATENT DOCUMENTS

| | | | |
|---|---|---|---|
| 292,425 | 1/1884 | Fry, Jr. | 56/374 |
| 2,514,861 | 7/1950 | Hackbrott | 56/244 |
| 2,711,065 | 6/1955 | Orelind | 56/376 |
| 2,728,181 | 12/1955 | Carpenter | 56/244 |
| 2,744,376 | 5/1956 | Miner | 56/244 |
| 2,957,294 | 10/1960 | Hallenbeck | 56/244 |
| 3,024,545 | 3/1962 | Clark et al. | 56/291 |
| 3,488,931 | 1/1970 | Matthews | 56/244 |
| 3,706,189 | 12/1972 | Rutherford | 56/13.4 |
| 4,250,621 | 2/1981 | Houle | 56/295 |
| 4,318,268 | 3/1982 | Szymanis | 56/255 |
| 4,361,000 | 11/1982 | Friberg | 56/13.4 |

FOREIGN PATENT DOCUMENTS

| | | | |
|---|---|---|---|
| 248800 | 10/1963 | Australia | 56/295 |
| 22588 | 1/1981 | European Pat. Off. | 56/295 |

*Primary Examiner*—Paul J. Hirsch

*Attorney, Agent, or Firm*—Cullen, Sloman, Cantor, Grauer, Scott & Rutherford

[57] ABSTRACT

A power lawn mower including a plastic endless chain type cutter assembly having a plurality of plastic whip sticks which produce aeration and suction within the mower casing for improving grass cutting and dispensing. Each whip stick includes an elongated generally flat portion which extends horizontally and merges with a main lift or curved wing portion with the wing portion including a leading impact edge and a trailing lift edge. In operation, the cutter assembly is moved continuously with the lift portions of the whip sticks acting to create an aerating effect for causing a vacuum or suction within the mower casing. This action causes a continuous flow of air to be drawn between the ground and casing for discharging cut grass outwardly through an opening in the casing. The whip sticks are permitted limited pivotal movement upon striking obstacles during rotation. The cutter assembly is supported during powered rotational movement on elongated horizontal portions of a chain guide and support member. A guard is mounted to the chain guide and support member, and the guard includes a slot along which the flat horizontal portions of the whip sticks move as they are being rotated. The guard and a portion of the mower casing form an enclosure or tunnel which permits efficient transferring of cut grass from the casing.

3 Claims, 5 Drawing Figures

ENDLESS CHAIN TYPE LAWN MOWER

BACKGROUND OF THE INVENTION

The present invention relates to a plastic endless chain type power lawn mower including a plurality of unique impact members which produce aeration and suction within the mower casing for improving grass cutting and dispensing.

In rotary motors, it has long been desired to provide resilient cutting members in order to permit increased cutter running speeds. Cutting members or teeth are usually attached to a rigid rotating member or to an inextensible link chain which travels over spaced pulleys or a guide track member. As the running speed is increased, oscillations, vibrations and other generated forces limit the speeds at which the cutting elements may be driven. Thus, there has been a need for a resilient endless chain type cutter assembly which is capable of high speed operation while improving grass cutting and dispensing.

It is accordingly an object of the invention to provide a resilient cutter assembly that is simple in construction, inexpensive to manufacture, and yet effective and efficient in use.

SUMMARY OF THE INVENTION

The lawn mower of the present invention includes an elongated elliptically shaped casing which is formed with a downwardly depending skirt and a discharge chute or opening. The lawn mower may be attached between the front and rear wheels on a garden type tractor as is conventional. An endless chain type cutter assembly including a plurality of whip sticks is mounted for rotational powered movement between sprockets within the casing.

The cutter assembly includes a pair of spaced apart plastic endless bands which are connected together at a plurality of locations by pins which pass through hub portions of the whip sticks. The endless bands are supported during powered rotational movement on elongated horizontal portions of a T-shaped chain guide and support member. The vertical leg portion of the chain guide and support member is secured to the inside of the casing at the top thereof.

The whip sticks are held in positions that are generally perpendicular to the endless bands by torsion springs which are tightly fitted within the respective hub portions with their opposite ends connected to the endless bands. The torsion springs permit the whip sticks limited pivotal movement upon striking obstacles during rotation.

Each whip stick includes an elongated generally flat portion which extends horizontally and merges with a main lift or curved wing portion. The curved wing portion includes a leading impact edge and a trailing lift edge. In operation, the cutter assembly is moved continuously with the lift portions of the whip sticks acting to create an aerating effect or causing a vacuum or suction within the casing. This action causes a continuous flow of air to be drawn between the ground and casing for discharging cut grass outwardly through the opening in the casing. Thus, the lift or wing portions create a continuous flow of air outwardly through the casing opening thereby providing a vacuum or suction within the casing which causes the grass to be raised for cutting and then dispensed.

A guard is mounted to the chain guide and support member for preventing cut grass from flowing back onto the endless chain bands. The guard includes a slot along which the flat horizonal portions of the whip sticks move as they are being rotated toward the discharge opening in the casing. Thus, the guard and the downwardly depending skirt of the casing form an inverted U-shaped enclosure or tunnel which terminates in the casing discharge opening thereby permitting efficient transferring of cut grass from the casing.

The components of the rotatable cutter assembly including the enless bands and whip sticks are made of a lightweight plastic material thereby providing a quiet, durable construction that is inexpensive and easily serviced. Further, the lightweight plastic construction permits high speed operation for impact cutting, aeration, and suction to lift the grass.

Other advantages and meritorious features of the endless chain type lawn mower of the present invention will be more fully understood from the following description of the invention, the appended claims, and the drawings, a brief description of which follows.

DETAILED DESCRIPTION OF THE INVENTION

Figure 1:
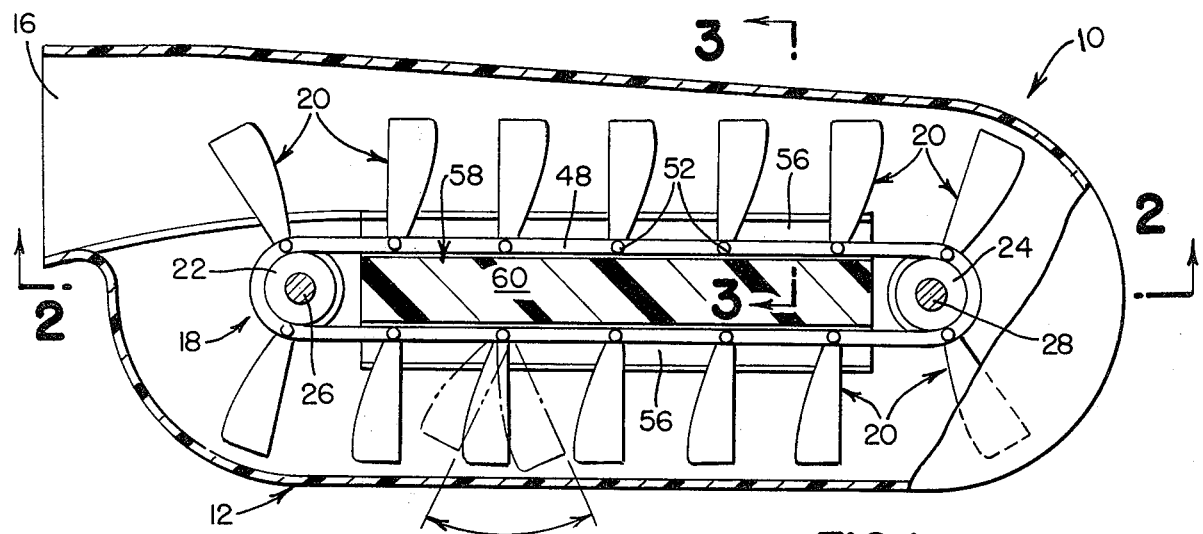
FIG. 1 is a top plan view of the endless chain type lawn mower of the present invention.
Figure 2:
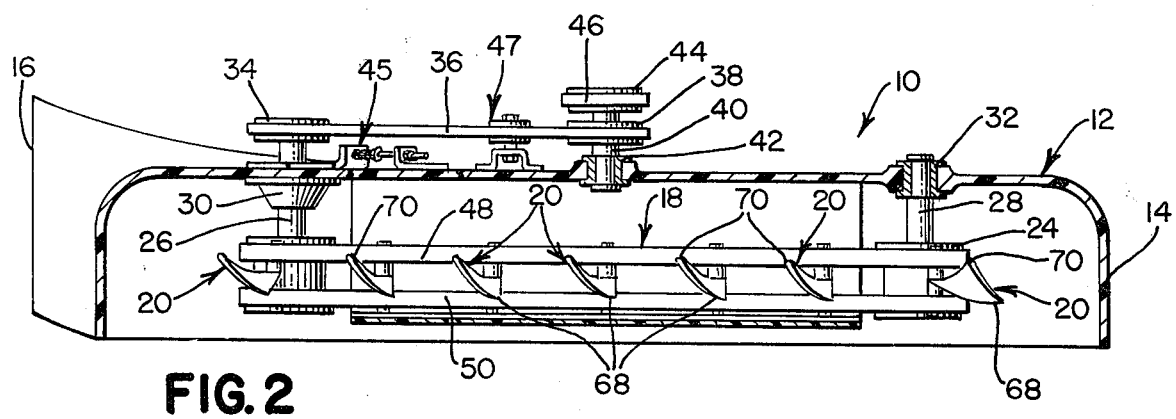
FIG. 2 is a side elevational view, partly in cross section, of the power lawn mower illustrated in FIG. 1 taken along line 2—2 in FIG. 1.

Referring to FIGS. 1-2, there is shown a lawn mower attachment 10 having a generally horizontally extending plastic casing or deck 12. The elongated ellipically shaped casing 12 is formed with a downwardly depending skirt 14 and a discharge chute or opening 16. Lawn mower attachment 10 may be mounted between the front and rear wheels on a garden type tractor (not shown) as is conventional, or it may be suspended in front of the garden tractor for better trimming mobility.

Figure 5:
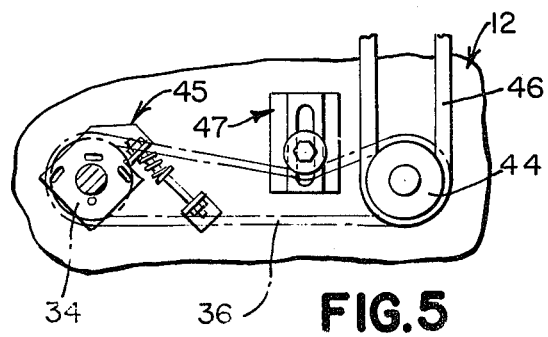
FIG. 5 is a detail view of the drive pulley arrangement.

An endless cutter assembly 18 including a plurality of whip sticks 20 is mounted for rotational powered movement between sprockets 22 and 24 within casing 12. Sprockets 22 and 24 are mounted at one end of drive shafts 26 and 28, respectively, and are rotatably connected to casing 12 by journal bearings 30 and 32. A pulley 34 is mounted to the other end of drive shaft 26 and a drive belt 36 connects pulley 34 with pulley 38 on drive shaft 40. Drive shaft 40 is rotatably mounted to casing 12 by journal bearing 42 and includes a pulley 44 at one end which is connected to the tractor engine (not shown) by means of drive belt 46 for receiving rotational driving power from the engine. Tensioning devices 45 and 47 are provided for increasing the tension on drive belt 36, as shown in FIGS. 2 and 5.

Cutter assembly 18 includes a pair of spaced apart endless bands 48 and 50 which are connected together at a plurality of locations by pins 52 which pass through the hub portions 54 of whip sticks 20. Endless bands 48 and 50 are supported during powered rotational movement by the elongated horizontal portions 56 of the T-shaped chain guide and support member 58. The vertical leg portion 60 of support member 58 is secured to the inside of casing 12 at the top thereof.

Figure 4:
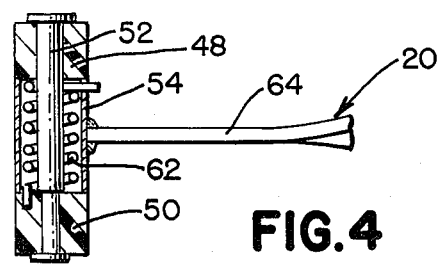
FIG. 4 is an enlarged side elevational view, partly in cross-section, of a whip stick impact member.

As described, whip sticks 20 are connected to endless bands 48 and 50 by pins 52 which pass through their hub portions 54. The whip sticks 20 are held in positions that are generally perpendicular to bands 48 and 50 by torsion springs 62 which are tightly fitted within hub portions 54 with their opposite ends connected to band 50 and hub portion 54, respectively (FIG. 4). Springs 62 permit the whip sticks limited pivotal movement as shown in the phantom line positions of FIG. 1 upon striking obstacles during rotation.

Each whip stick 20 includes an elongated generally flat portion 64 which extends horizontally and merges with a main lift or curved wing portion 66. The curved wing portion includes a leading impact edge 68 and a trailing lift edge 70. In operation, the cutter assembly 18 is moved continuously in a counterclockwise direction as viewed in FIG. 1 for impact cutting with the lift portions 66 of whip sticks 20 acting to create an aerating effect for causing a vacuum or suction within casing 12. This action causes a continuous flow of air to be drawn between the ground and casing skirt 14 for discharging cut grass outwardly through opening 16. Thus, the lift or wing portions 66 create a continuous flow of air outwardly through casing opening 16 thereby providing a vacuum or suction within casing 12 which causes the grass to be raised for cutting and then dispensed.

Figure 3:
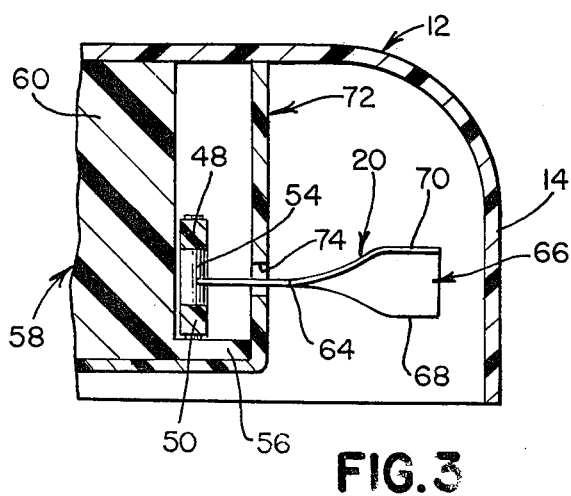
FIG. 3 is a cross-sectional view taken along line 3—3 in FIG. 1.

Referring to FIG. 3, a plastic guard 72 is mounted to support member 58 for preventing cut grass from flowing back onto chain bands 48 and 50. Guard 72 includes a slot 74 along which the flat horizontal portions 64 of whip sticks 20 move as they are being conveyed toward discharge opening 16. Thus, guard 72 and skirt 14 form an inverted U-shaped enclosure or tunnel which terminates in discharge opening 16 thereby permitting efficient transference of cut grass from casing 12.

The components of the rotatable cutter assembly including endless bands 48 and 50 and whip sticks 20 are formed of a lightweight plastic material thereby providing a quiet, durable construction that is inexpensive and easily serviced. Further, the lightweight plastic construction permits high speed operation for impact cutting, aeration, and suction to lift the grass.

It will be apparent to those skilled in the art that the foregoing disclosure is exemplary in nature rather than limiting, the invention being limited only by the appended claims.

I claim:

1. A lawn mower comprising a generally horizontally extending elongated open bottom housing having a grass discharge opening on one side thereof, said housing having a generally vertical side wall, an endless chain-like plastic cutter assembly supported for powered rotational movement within said housing, said cutter assembly including a plurality of plastic impact members, each impact member including an elongated generally flat portion extending horizontally and merging with a curved wing portion having a leading impact edge and a trailing lift edge, said cutter assembly further including a pair of spaced apart generally parallel plastic endless bands and means for connecting said impact members between said bands, said connecting means permitting said impact members limited pivotal movement upon striking obstacles during rotation of said cutter assembly, and said cutter assembly being rotated with the lift portions of said impact members acting to create an aerating effect and vacuum or suction within said housing for causing grass to be raised for cutting and for discharging cut grass outwardly through said opening in said housing.

2. The lawn mower as defined in claim 1 wherein said endless bands being supported for powered rotational movement on elongated horizontal portions of a support and guide member which is connected to said housing.

3. The lawn mower as defined in claim 2 including a guard member mounted to said support and guide member, said guard member including an elongated slot along which the flat horizontal portions of said impact members move as said impact members are being rotated, said guard member and said housing side wall forming an enclosure or tunnel which terminates adjacent the housing discharge opening thereby permitting efficient transferring of cut grass from said housing.

* * * * *